United States Patent [19]

Granatstein et al.

[11] 4,224,576
[45] Sep. 23, 1980

[54] GYROTRON TRAVELLING-WAVE AMPLIFIER

[75] Inventors: Victor L. Granatstein; Phillip Sprangle, both of Silver Spring, Md.; Adam T. Drobot, Annandale, Va.; Kwo R. Chu, Annandale, Va.; J. Laurence Safter, Alexandria, Va.

[73] Assignee: The United States of America as represented by the Secretary of the Navy, Washington, D.C.

[21] Appl. No.: 943,894

[22] Filed: Sep. 19, 1978

[51] Int. Cl.³ .................... H01S 1/00; H01J 23/16
[52] U.S. Cl. ........................... 330/4; 330/4.7; 315/3; 315/5
[58] Field of Search ............ 330/4, 4.7, 43; 315/4, 315/5, 3; 332/7.5

[56] References Cited

U.S. PATENT DOCUMENTS

| | | | |
|---|---|---|---|
| 3,122,710 | 2/1964 | Miller | 315/3 |
| 3,233,182 | 2/1966 | Adler | 315/3 |
| 3,398,376 | 8/1968 | Hirshfield | 330/4.7 |
| 3,450,931 | 1/1969 | Feinstein et al. | 315/5 |
| 3,457,450 | 7/1969 | Feinstein et al. | 315/5 |
| 3,463,959 | 8/1969 | Jory et al. | 315/5 |
| 3,789,257 | 1/1974 | Friedman et al. | 315/3 |
| 4,143,299 | 3/1979 | Sprangle et al. | 315/5 |

OTHER PUBLICATIONS

Chu et al., "Calculation of Optimum . . . Amplifier," 10/77, pp. 1–24, NRL Memor. Report 3553.
Granatstein et al., "Microwave Amplification . . . Beam", pp. 3800–3805, J. Appl. Phys., vol. 46 (1975).
Sprangle et al., "Stimulated Cyclation . . . Radiation", 7/74, 12p, Rept. No. NRL-MR-2834.
Chu et al., "Theory and Single Wave . . . Harmonics", 8/78, pp. 1–47, NRL-MR-3788, AD-E000228.
Toytsev et al., "Millimeter and . . . Gyrotrons", 5/74, Radio Engin. and Elect. Phys., pp. 103–107, vol. 19.
Kisel et al., "An Experimental Study . . . Field", 4/74, pp. 95–100, Radio Engin. and Elect. Phys., pp. 95–100, vol. 19.

Primary Examiner—Nelson Moskowitz
Attorney, Agent, or Firm—R. S. Sciascia; Philip Schneider; Vincent J. Ranucci

[57] ABSTRACT

An apparatus for amplifying coherent radiation at millimeter and submillimeter wavelengths includes the combination of a travelling-wave-tube cyclotron-maser-amplifier structure and a magnetron-injection electron gun. The amplifier structure includes a fast-wave drift tube and an electromagnetic wave launcher within the bore of a superconducting magnet. The magnetron-injection electron gun is also within the bore of the magnet and is coupled to the drift tube. As a travelling wave is launched in a preferred mode in the drift tube, the electron gun injects an annular beam of relativistic electrons having both large energy transverse to the axis of the device and small energy spread into the drift tube so that the electrons gyrate at their cyclotron frequency in orbits about the lines of the axial magnetic field produced by the magnet. The travelling wave is amplified by extracting energy from the relativistic electron beam. Efficiency of this energy transfer is optimized by tapering the magnetic field near the output end of the wave-beam interaction region.

12 Claims, 7 Drawing Figures

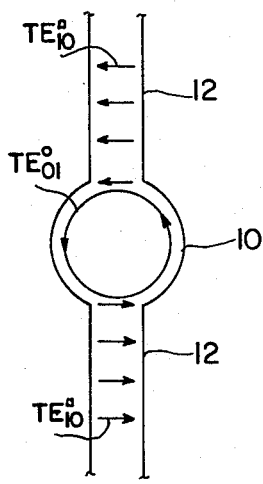
FIG. 3
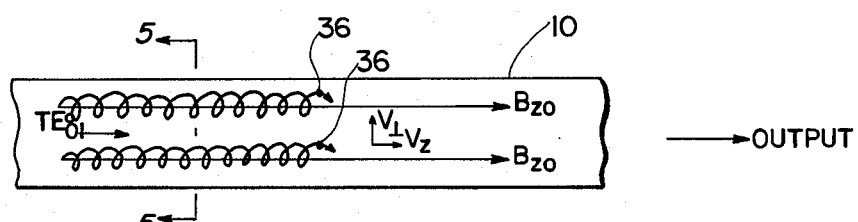
FIG. 4
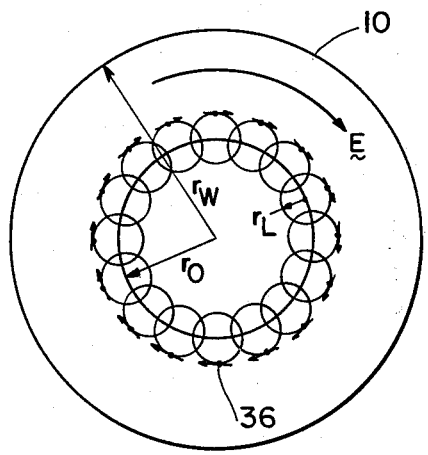 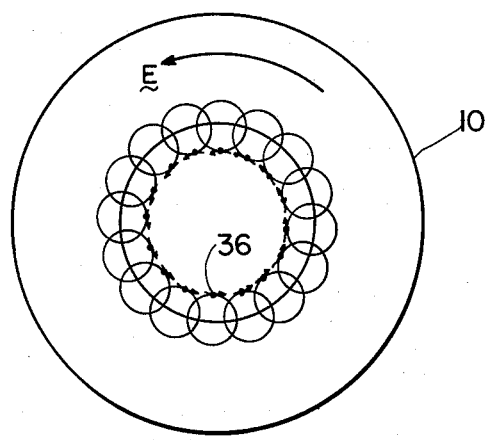
FIG. 5A    FIG. 5B

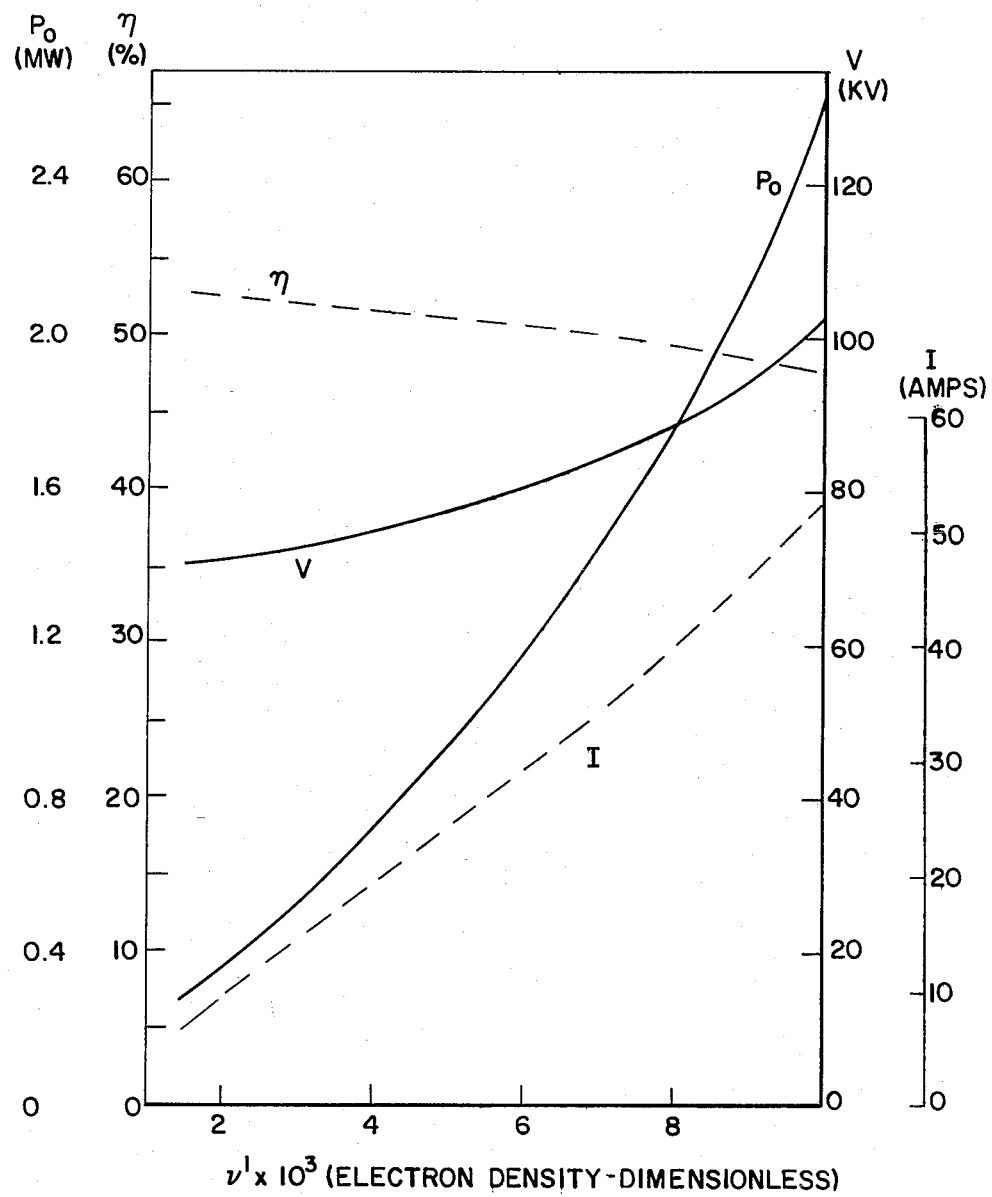

GYROTRON TRAVELLING-WAVE AMPLIFIER

BACKGROUND OF THE INVENTION

This invention relates to a microwave amplifier and especially to a travelling-wave amplifier of coherent radiation at millimeter and submillimeter wavelengths.

Existing microwave amplifiers, such as conventional travelling wave tubes, are slow-wave devices having periodic structures of certain dimensions such that the structures are in resonance with the wave which is to be amplified. Thus, the physical size of the periodic structures must be varied in order to amplify waves of different frequencies. This feature limits both the tunability of conventional amplifiers and the ability of such amplifiers to accommodate high power as the wavelength becomes very small because smaller wavelengths require amplifiers with smaller, more delicate, periodic structures. Therefore, the power level of these devices falls sharply at millimeter and submillimeter wavelengths.

SUMMARY OF THE INVENTION

It is the general purpose and object of the present invention to provide an amplifier of millimeter and submillimeter wavelength radiation which is characterized by wide tunability, high power levels, wide bandwidth, and good efficiency. This and other objects of the present invention are accomplished by the combination of a magnetron-injection electron gun and a travelling-wave-tube cyclotron-maser-amplifier structure. The amplifier structure has a fast-wave drift tube, a launcher for electromagnetic waves, and a superconducting magnet, but no resonant cavities or periodic structures. The electron gun and wave launcher are coupled to the drift tube within the bore of the magnet to propagate both an annular electron beam, in which the electrons gyrate in cyclotron orbits about the lines of an axial magnetic field, and a travelling wave.

A travelling wave of chosen frequency $\omega$ and chosen waveguide mode is launched in the drift tube. The injection gun provides a hollow circular beam of relativistic electrons having both large energy transverse to the axis of the device and small energy spread. The electrons gyrate in their orbits within the drift tube at a cyclotron frequency $\omega_{ce} = qB_{zo}/m$, where q and m are the charge and relativistic mass, respectively, of an electron, and $B_{zo}$ is the strength of the applied magnetic field about the drift tube. The gyrating electrons transfer energy to the travelling wave when $\omega$ is slightly higher than $\omega_{ce} + k_z v_z$ where $k_z$ is the axial wave number of the electromagnetic wave and $v_z$ is the axial velocity of the electrons.

An advantage of the invention is that amplification is a function of the cyclotron frequency $\omega_{ce}$ of the device which is determined by the applied magnetic field and the relativistic mass of the electrons, and not by the dimensions of a resonant structure. Therefore, no resonant cavities nor periodic structures are employed and the device can operate at very high power levels with wide bandwidth and very wide tunability. Thus, unlike most other microwave amplifier tubes, the internal dimensions of the device may be large compared to the wavelength, and usage at high power is compatible with operation at millimeter and submillimeter wavelengths.

Another advantage of the invention is that a tapered magnetic field near the end of the wave-electron beam interaction region maximizes efficiency.

Other objects and advantages of the invention will become apparent from the following detailed description of the invention when considered in conjunction with the accompanying drawings wherein:

BRIEF DESCRIPTION OF THE DRAWING

FIG. 3 is a cross-sectional view taken along the line 3—3 of FIG. 1 and shows a $TE_{01}^0$ wave launched in the circular drift tube by the combination of $TE_{10}^\square$ waves from two rectangular waveguides having equal magnitude but opposite phase.

FIG. 4 is a cutaway schematic view showing the electrons gyrating about the axial magnetic field.

FIGS. 5A and 5B are cross-sectional views of the electron beam shown in FIG. 4 taken along the line 5—5 and show the phase synchronism between the electron orbits and the $TE_{01}^0$ wave on alternate half cycles of the azimuthal electric field E within the circular drift tube.

FIG. 6 is a graph showing operating parameters optimized for maximum efficiency for a selected electron beam velocity ratio $\alpha$ (transverse velocity to axial velocity) of 1.5, a travelling wave in the $TE_{01}^0$ mode, and operating near the fundamental cyclotron frequency.

DETAILED DESCRIPTION OF THE INVENTION

Figure 1:
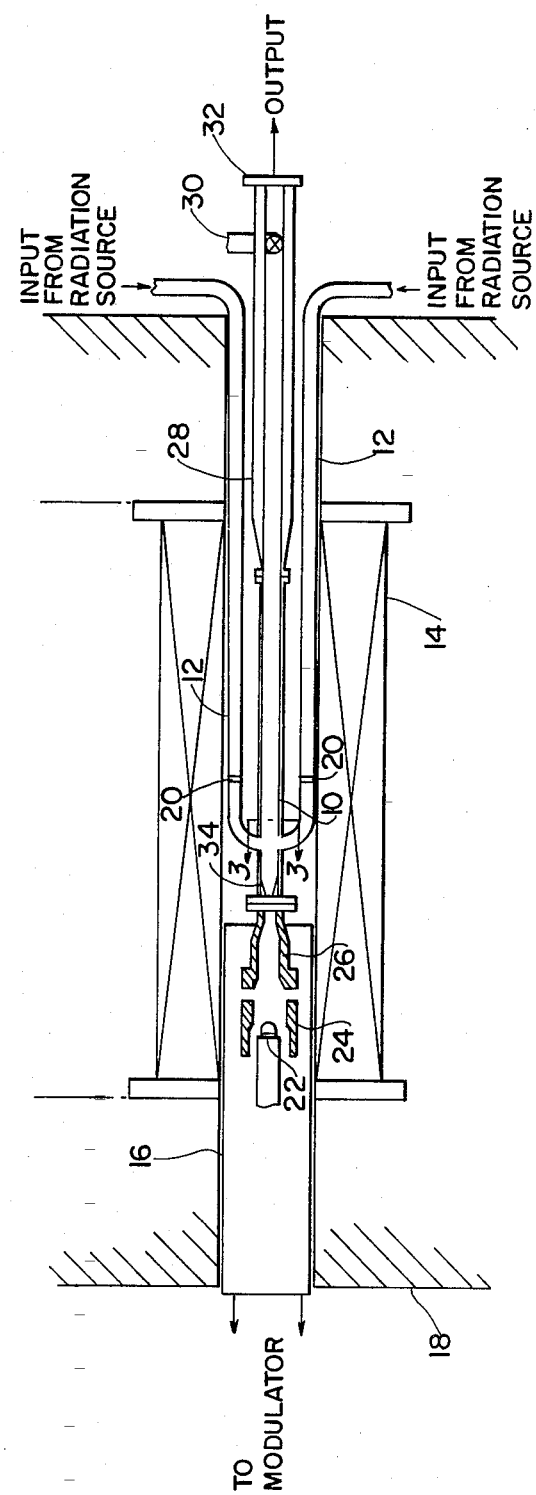
FIG. 1 is a cutaway sectional view of an illustrative embodiment of the present invention.

FIG. 1 shows a travelling-wave-tube cyclotron-maser-amplifier structure comprising a fast wave drift tube 10 of circular cross-section coupled to two input feed waveguides 12 of rectangular cross-section conveniently situated within the bore of a superconducting solenoid 14. A magnetron injection electron gun 16 extends into the bore of the solenoid 14 and suitably couples to the drift tube 10. The bore of the solenoid 14 is coaxial with the bore of a dewar 18 so that the electron gun 16, drift tube 10 and waveguides 12 are conveniently inserted into the bore of the dewar 18 which holds the solenoid 14. The electron gun connects to a modulator which supplies the required operating voltages and currents. The input feed waveguides 12 are connected to a source of coherent electromagnetic radiation, such as a microwave oscillator. The modulator, radiation source, and drift tube output are typically located external to the dewar 18. Liquid helium within the dewar 18 conveniently surrounds and cools the solenoid 14. The dewar 18 is made of a material, such as non-magnetic stainless steel, which is suitable for the configuration herein described and which will hold the liquid helium.

The drift tube 10 and each waveguide 12 are fabricated from standard waveguide material. The waveguides 12 are suitably coupled to the drift tube 10 at points approximately 180° diametrically apart. The region within the drift tube 10 is evacuated to a vacuum of about $10^{-8}$ Torr which is standard for microwave tubes, and is separated from the radiation source by a pressure window 20 typically located within each waveguide 12 at a point near the intersection with the drift tube.

The electron gun 16 has a thermionic cathode 22, an intermediate beam-forming electrode 24, and an anode 26 whose contours and voltages are chosen together with the contour of the magnetic field from the solenoid 14, to produce and propagate an annular electron beam with both large energy transverse to the axis of the gun and small energy spread, in which beam the electrons gyrate at a cyclotron frequency in orbits around the lines of the magnetic field, and in which beam the velocity ratio $\alpha$ of the electrons, that is, the ratio of transverse electron velocity $V_\perp$, to axial electron velocity $V_z$, is preferably in the range $1.5 < \alpha < 2.5$.

The outer circumference of the portion of the drift tube 10 extending approximately externally of the core of the solenoid 14 is an electron beam collector 28 which is designed to collect the spent electrons and dissipate the resulting heat. The drift tube 10 has a deflection magnet 30 located just prior to an output pressure window 32 which terminates the drift tube. A conical microwave absorber 34, formed from standard material which absorbs microwave energy in a high vacuum, is located within the drift tube 10 close to the point of coupling with the electron gun. The absorber 34 suppresses feedback oscillations. Amplification is optimum in the $TE_{01}{}^0$ mode, but operation of the device is possible with other waveguides modes, with drift tubes of non-circular cross-section, and with other types at wave launchers.

Figure 2:
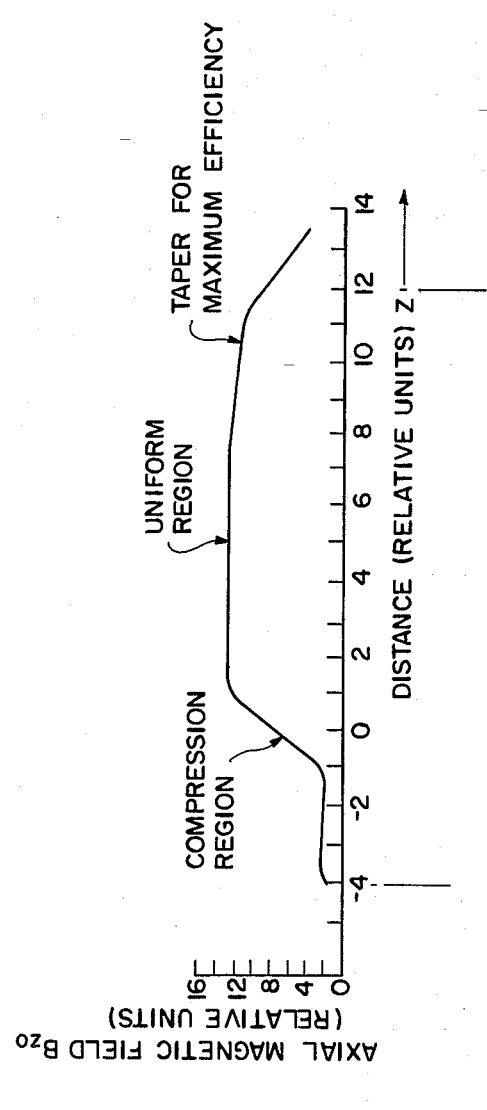
FIG. 2 is a graph of axial magnetic field versus distance in the device of FIG. 1.

The solenoid 14 provides a magnetic field in the region of the electron gun 16 and drift tube 10. A graph of the strength, with axial distance, of the axial component $B_{zo}$ of the magnetic field about the electron gun 16 and drift tube 10 is shown in FIG. 2. The compression region of the magnetic field comprises a radial component $B_{rg}$ and an axial component $B_{zg}$. As an annular electron beam is emitted at relativistic speeds from the thermionic cathode 22 toward the intermediate electrode 24, the radial component $B_{rg}$ and the axial component $B_{zg}$ of the magnetic field cause the electrons to form cyclotron orbits transverse to the axis of the device. The compression region of the magnetic field compresses the beam to provide an inward velocity component and thus to form the electron velocity ratio $\alpha$ as the beam propagates through the anode 26 and into the drift tube 10. After being compressed, the beam enters a region of uniform magnetic field $B_{zo}$ within the drift tube 10.

A signal of selected frequency $\omega$ from the radiation source propagates through each waveguide 12 as a $TE_{10}{}^\square$ wave of equal amplitude and opposite phase, as shown in FIG. 3, to launch a $TE_{01}{}^0$ wave which propagates in the drift tube 10 in a direction toward the output pressure window 32. The beam, comprising bunches 36 of relativistic electrons, propagates in the drift tube 10 in the same direction as the $TE_{01}{}^0$ wave in the presence of the axial magnetic field, such that the electrons gyrate in cyclotron orbits at a cyclotron frequency $\omega_{ce}$ about the lines of the magnetic field, see FIG. 4. The beam interacts with the $TE_{01}{}^0$ wave and amplifies the wave as the beam and wave propagate.

Initially, the phases of the electrons in their cyclotron orbits are random, but phase-bunching occurs because of the relativistic change of mass of the electrons. Those electrons that lose energy to the wave become lighter and accumulate phase-lead while those electrons that gain energy from the wave become heavier and accumulate phase-lag. Phase-bunching results and the electrons radiate coherently in bunches 36 and amplify the wave.

The bunched electrons 36 are distributed around the electron beam radius $r_o$, while gyrating in the cyclotron orbits of radius $r_L$ where $r_L$ is typically much smaller than $r_o$ as depicted in FIGS. 5A and B. These figures show the phase synchronism between the electron orbits and the electric field E of the $TE_{01}{}^0$ wave on alternate half-cycles, assuming that the wave frequency $\omega$ is close to the cyclotron frequency $\omega_{ce}$. Energy transfer from the electrons 36 to the wave is optimum when $\omega$ is slightly higher than $\omega_{ce} + k_z V_z$, where $k_z$ is the axial wave number of the electromagnetic wave and $v_z$ is the axial velocity of the electrons.

The phase synchronism enables the device to amplify, and since $\omega_{ce} = qB_{zo}/m$, where q and m are the charge and relativistic mass, respectively, of an electron 36, amplification occurs at a wavelength determined by the applied magnetic field $B_{zo}$. Thus, to amplify a $TE_{01}{}^0$ wave of frequency $\omega$, a magnetic field $B_{zo}$ is selected so that $\omega_{ce} + k_z v_z$ is slightly lower than $\omega$.

The electron guns 16, drift tube 10, and waveguides 12 are placed within the bore of the solenoid 14 to facilitate the interaction between the magnetic field and the electron beam. The contour of the magnetic field must be precisely shaped over the entire electron beam to provide the proper trajectory of the electrons 36. Such control is essential because of the great impact that small changes in the magnetic field have on both the efficiency of the device and the operation of the electron gun 16. The electron gun 16 may be placed externally of the solenoid 14, but in that case the contour of the magnetic field is much more gradual and, obviously, the length of the system is greater.

As the electron beam propagates in the drift tube 10 past the solenoid 14, the beam expands radially and follows the lines of the magnetic field into the electron collector 28. The amplified $TE_{01}{}^0$ wave continues to propagate axially until it leaves the drift tube 10 through the output pressure window 32. The deflection magnet 30 prevents stray electrons from bombarding the output pressure window 32. The microwave absorber 34 prevents spurious oscillations and prevents microwave energy from entering the electron gun 16.

As the wave and beam propagate, amplification saturates because the electrons become trapped in a phase of their cyclotron orbits relative to the phase of the wave such that the transfer of energy from the beam to the wave no longer occurs. In order to inhibit the saturation, the magnetic field may be tapered (see FIG. 2) to change the phase of the electrons, or the radius of the drift tube may be tapered to change the phase of the electric field of the wave.

The parameters relevant to the magnetron-injection electron gun 16 are: current I, voltage V, radius of the electron beam $r_o$, and $\alpha = v_\perp / v_z$. The parameters of the drift tube 10 are the radius $r_w$ and length L. The interaction of the electron beam and the wave requires a specific magnetic field $B_{zo}$ for the particular frequency $\omega$ of the wave.

To determine these parameters select the following:

a. $1.5 < \alpha < 2.5$ where 1.5 provides conservative design and 2.5 gives optimum efficiency;

b. The mode of the travelling wave, preferably the $TE_{01}{}^0$ mode which will be used in these calculations;

c. power output $P_o$;

d. the harmonic s, preferably s = 1, of the cyclotron frequency $\omega_{ce}$; and e. the frequency $\omega$ of the wave to be amplified, and using a single -wave particle simulation code, which employs the relativistic Lorentz force equation in which the fields are those of the selected electromagnetic mode (e.g., $TE_{01}^0$) and the applied steady magnetic field $B_{zo}$ and in which the frequency and amplitude of the electromagnetic mode are self-consistently evaluated using Maxwell's wave equation, calculate the large signal dynamics of the particle trajectories for an ensemble of particles and generate curves such as those in FIG. 6 (for which the $TE_{01}^0$ mode, $\alpha=1.5$, and $s=1$ were selected) which provide the values of V and I for a maximum efficiency $\eta$ at a given power output $P_o$.

Wave amplification results from the interaction between the circular waveguide mode whose frequency is given by, $$\omega^2 = k_z^2 c^2 + \omega_c^2 \tag{1}$$

and the frequency of the cyclotron beam mode, $$\omega = k_z v_z + q B_{zo}/m \tag{2}$$

where $k_z$ is the axial wave number, c is the speed of light, and $\omega_c$ is the cutoff frequency of the wave, that is, the minimum frequency at which the wave will propagate in the drift tube 10.

In order to achieve high efficiency, it is desirable to select the magnetic field such that the two curves represented by equations (1) and (2) meet at a grazing angle, that is, with the group velocity $(k_z c^2/\omega)$ of the waveguide mode nearly equal to the velocity $(v_z)$ of the electron beam.

Assume $v_z$ is equal to the group velocity of the wave. Therefore, $$v_z = (k_z^2 c^2 + \omega_c^2)^{\frac{1}{2}} k_z c^2. \tag{3}$$

The voltage V is selected from the curve of FIG. 6 and $$V = (\gamma - 1) \frac{m_o c^2}{q}, \tag{4}$$

where $m_O$ is the rest mass of an electron and $$\gamma = \left(1 - \frac{v_z^2}{c^2} - \frac{v_\perp^2}{c^2}\right)^{-\frac{1}{2}} \tag{5}$$

and $$\alpha = \frac{v_\perp}{v_z} \tag{6}$$

where $\alpha$ had been selected as 1.5 to develop the curves of FIG. 6.

Solving, simultaneously, equations (4), (5), and (6) provide values for $\gamma$, $v_z$ and $v_\perp$.

The relativistic mass m of an electron appears in equation (2) and may be determined by $$m = \gamma m_o. \tag{7}$$

Since $\omega$, $v_z$ and m are known and c and q are constants, solving equations (1), (2) and (3) provides the values for $k_z$, $\omega_c$ and $B_{zo}$.

In practice, it may be necessary to tune the magnetic field $B_{zo}$ by approximately 4 percent from the value obtained above to provide the optimum operation condition.

For a wave in the $TE_{01}^0$ mode, $$r_w = 2\pi 0.609 c/\omega_c)$$

For maximum interaction between the electron beam and the $TE_{01}^0$ wave the radius $r_o$ of the beam should equal the radius of the electric field of the wave. Thus for a $TE_{01}^0$ wave $$r_o = 0.48 r_w \tag{9}$$

The gain of the system is $$P_o/P_i = e^{2\Gamma_L L} \tag{10}$$

where $P_o$ is the specified power output, $P_i$ is the power input and is a known factor according to available driver radiation sources, e is the base of the natural logarithm, L is the length of the drift tube 10 and $$\Gamma_L = \frac{1}{c} \left[ \frac{v_\perp^2}{c^2} \frac{\omega_c^2}{\omega_o} \delta\omega \frac{W(X)}{Q(X)} - \frac{2}{3}\delta\omega \right]^{\frac{1}{3}} \tag{11}$$

where $$\delta\omega = |\eta_b e^2 Q(X)/6 m_0 \epsilon_0|^{\frac{1}{3}} \tag{12}$$

and $\eta_b$ is the electron density averaged over a cross-section of the drift tube and is therefore a function of the current I and radius $r_w$ of the drift tube. Also, in equation (12)

$$X = \frac{\omega_c}{\left(\frac{qB_{zo}}{m}\right)} \frac{v_\perp}{c}, \tag{13}$$

$$Q(X) = (X^{-2} - 1) \frac{dJ_1^2(X)}{dX}, \text{ and} \tag{14}$$

$$W(X) = [J_1(X)]^2 \tag{15}$$

where $J_1$ is the Bessel function of the first kind order one. Solving equations (10) through (15) provides the length L of the drift tube.

The parameters of the magnetron-injection electron gun (I, V, $r_o$, $\alpha$, $v_\perp$ and $v_z$), drift tube ($r_w$ and L) and the magnetic field $B_{zo}$ are thereby determined for amplifying a travelling wave of a desired mode and frequency $\omega$.

Obviously more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A gyrotron travelling-wave amplifier comprising in combination:
   wave-launching means for launching a travelling wave in a preferred mode at a selected frequency $\omega$;
   beam-producing means for forming and propagating an annular beam of electrons at relativistic speeds along a path;
   a fast-wave structure, coupled to said wave-launching means and said beam-producing means, wherein said wave and said beam propagate and interact for transferring energy from said beam to said wave, thereby amplifying said wave; and means for forming a magnetic field B about said beam-producing means and fast-wave structure, said magnetic field having a uniform axial component $B_{zo}$ in the region of the fast-wave structure and said magnetic field having both an axial component $B_{zg}$ and a radial component $B_{rg}$ about said beam-producing means, said axial $B_{zg}$ and radial $B_{rg}$ components being chosen so as to form a beam of electrons with a velocity component $v_\perp$, transverse to the axial direction, for causing said electrons to form cyclotron orbits about the axial lines of said magnetic field $B_{zo}$, said magnetic field $B_{zo}$ being chosen for causing said electrons to gyrate in said orbits at a cyclotron frequency $\omega_{ce}$ given by $\omega_{ce} \times qB_{zo}/m$, where q and m are the charge and relativistic mass, respectively, of an electron, and where $B_{zo}$ is of a magnitude such that said selected frequency $\omega$ of said travelling wave is slightly higher than $qB_{zo}/m + k_z v_z$, where $k_z$ is the axial wave number of the travelling wave and $v_z$ is the axial velocity of the electrons.

2. A gyrotron travelling-wave amplifier as recited in claim 1, wherein said fast-wave structure includes microwave absorbing material and microwave mode traps for stabilizing the operation as an amplifier in the desired mode.

3. A gyrotron travelling-wave amplifier as recited in claim 1, wherein said means for forming a magnetic field provides a tapered mangetic field near the output end of said fast-wave structure for changing the phase of the electrons of said beam relative to the phase of the electric field of said wave for optimizing the transfer of energy from said beam to said wave.

4. A gyrotron travelling-wave amplifier as recited in claim 1, wherein said beam-producing means comprises a magnetron-injection gun.

5. A gyrotron travelling-wave amplifier as recited in claim 1, wherein said wave-launching means comprises waveguides for conducting waves of equal amplitude and opposite phase and for coupling to said fast-wave structure for launching a wave therein.

6. A gyrotron travelling-wave amplifier as recited in claim 2, wherein said fast-wave structure is tapered near the output end for changing the phase of the electric field of said wave relative to the phase of the electrons of said beam for optimizing the transfer of energy from said beam to said wave.

7. A gyrotron travelling-wave amplifier as recited in claim 3, wherein said means for forming a magnetic field includes a superconducting solenoid.

8. A gyrotron travelling-wave amplifier as recited in claim 5, wherein said waveguides are of rectangular cross-section.

9. A gyrotron travelling-wave amplifier as recited in claim 6, wherein said fast-wave structure comprises a drift tube.

10. A gyrotron travelling-wave amplifier as recited in claim 8, wherein said fast-wave structure is of circular cross-section.

11. a gyrotron travelling-wave amplifier as recited in claim 10, wherein said waveguides are coupled to said fast-wave structure at points approximately diametrically apart.

12. A method for optimizing the parameters of the gyrotron travelling-wave amplifier of claim 1 for amplifying a travelling wave of a desired mode and frequency comprising the steps of:

selecting a magnetron injection gun which provides an annular beam of relativistic electrons, which gyrate in cyclotron orbits at a cylotron frequency $\omega_{ce}$, said beam having a velocity ratio $1.5 < \alpha < 2.5$ as defined by $\alpha = v_\perp/v_z$ where $v_\perp$ is the transverse velocity of the electrons and $v_z$ is the axial velocity of the electrons;

selecting a mode of a travelling wave which is to be amplified;

selecting the frequency $\omega$ of said travelling wave;

selecting an applied magnetic field $B_{zo}$;

selecting a power output $P_o$;

selecting a harmonic s of the cyclotron frequency $\omega_{ce}$;

using a single-wave particle simulation code, which employs the relativistic Lorentz force equation in which the fields are those of the selected travelling wave mode and the applied magnetic field $B_{zo}$ and in which the frequency and amplitude of the travelling-wave mode are self-consistently evaluated using Maxwell's wave equation, calculate the large signal dynamics of the particle trajectories for an ensemble of particles for generating values for voltage V and current I for a maximum efficiency at the power output $P_o$;

solving the following equations simultaneously;

$\omega^2 = k_z^2 c^2 + \omega_c^2$ where $\omega$ is the frequency of the wave mode, $k_z$ is the axial wave number, c is the speed of light, and $\omega_c$ is the cutoff frequency of the wave, $\omega = k_z v_z = qB_{zo}/m$ where $\omega$ is the frequency of the cyclotron beam mode, q and m are the charge and relativistic mass, respectively, of an electron, and $B_{zo}$ is the applied axial magnetic field about said drift tube, $$v_z = (k_z^2 c^2 + \omega_c^2)^{\frac{1}{2}} k_z c^2,$$

$V = (\gamma - 1) m_o c^2 / q$, where V is selected from the values determined by said simulation code;

$$\gamma = (1 - \frac{v_z^2}{c^2} - \frac{v_\perp^2}{c^2})^{-\frac{1}{2}},$$

and $m_o$ is the rest mass of an electron as defined by $$m_o = m/\gamma,$$

and $$\alpha = v_{195}/v_z,$$

said equations providing the values for $\gamma$, $v_z$, $v_\perp$, $k_z$, $\omega_c$, $B_{zo}$ and $r_w$ and $r_o$ where $r_w$ is the radius of the drift tube for a given wave mode, as for example $r_w = 2\pi (0.609 c/\omega_c)$ for a wave in the $TE_{01}^0$ mode, and $r_o$ is the radius of said electron beam for a given wave mode, as for example $r_o = 0.48\ r_w$ for a wave in the $TE_{01}^0$ mode;

tuning said value of the magnetic field $B_{zo}$ by approximately four percent;

solving the following equations simultaneously:

$P_o/P_i = e^{2\Gamma L L}$ which is the gain of the system and where $P_i$ is the power input, e is the base of the natural logarithm, L is the length of the drift tube, and $$\Gamma_L = \frac{1}{c} \left[ \frac{v_\perp^2}{c^2} \frac{\omega_c^2}{\omega_o} \delta\omega \frac{W(X)}{Q(X)} - \tfrac{2}{3}\delta\omega \right]^{\tfrac{1}{2}}$$

where $\delta\omega = |\eta_b e^2 Q(X)/6 m_o \epsilon|^{\tfrac{1}{2}}$ where $\eta_b$ is the electron density average over a cross-section of the drift tube, $$X = \frac{\omega_c}{\left(\frac{qB_{zo}}{m}\right)} \frac{v_\perp}{c},$$

$Q(X) = (X^{-2} - 1) \, dJ_1^2(X)/dX$, and $W(X) = [J_1(X)]^2$ where $J_1$ is the Bessel function of the first kind order one, said equations providing the value of the length L of the drift tube.

* * * * *

UNITED STATES PATENT OFFICE
CERTIFICATE OF CORRECTION

PATENT NO. : 4,224,576

DATED : September 23, 1980

INVENTOR(S) : Victor L. Granastein, et al.

It is certified that error appears in the above—identified patent and that said Letters Patent are hereby corrected as shown below:

Title page, Item 75, inventors name "Laurence Safter" should be --Laurence Seftor--.

Signed and Sealed this

Twenty-fourth Day of August 1982

[SEAL]

Attest:

GERALD J. MOSSINGHOFF

Attesting Officer     Commissioner of Patents and Trademarks